Patented Nov. 14, 1933

1,934,803

UNITED STATES PATENT OFFICE 1,934,803

SEED DISINFECTANT

Morris S. Kharasch, Chicago, Ill., assignor to E. I. du Pont de Nemours & Company, Wilmington, Del., a corporation of Delaware No Drawing. Application July 31, 1929
Serial No. 382,587

9 Claims. (Cl. 167—38)

This invention relates to improved disinfectant compositions, and more particularly to such compositions suitable as seed disinfectants, and comprises certain classes of organic mercury compounds not heretofore suggested for this purpose.

It has heretofore been proposed to use, as disinfectants for seeds, certain types of organic mercury compounds, such for example as mercurized phenolic compounds and the like. Many of these compounds proposed for this purpose have been found very useful, certain particular compounds being found preferable for one purpose, while others have been found preferable for certain other purposes.

It is an object of my present invention to provide new types of disinfectants. A further object of my invention is an improved disinfectant of particular value for the treatment of certain plant products and certain plant diseases.

In general, my invention comprises disinfectant compositions containing as an active ingredient one or more mercury compounds of thiophene or thiophene derivatives, either as the sole active ingredient, or together with other active disinfectant materials suitable for this purpose.

In order to more clearly illustrate the types of compounds that I have found to be effective for the purpose disclosed, the following examples are given, but it is to be understood that these examples are illustrative merely and that other embodiments exist and may be practiced within the scope of my invention.

Example 1

1.5 parts of alpha-chlormercuri thiophene are intimately mixed with 97.5 parts of calcium carbonate and 1 part charcoal. The dry mixture thus obtained can be used for dusting seeds and will be found to give excellent control of many seed borne diseases.

Example 2

2 parts of alpha-mercury-dithienyl are mixed with 97 parts of calcium sulfate and 1 part of lime. The resulting mixture will be found to be an excellent seed disinfectant.

Example 3

1 part of alpha-chlormercuri-thiophene and 0.5 part of 2:5-dichlormercuri-thiophene are intimately mixed with 96.5 parts of bentonite and 2 parts of charcoal. This product can be dusted on seeds for the control of seed borne diseases or it can be suspended in water and used for the wet treatment of seeds or other plant products.

Example 4

1 part of 2-acetoxymercuri-5-hydroxymercuri-thiophene and 0.5 part of mercurized chlorphenol are intimately mixed with 96.5 parts of infusorial earth and 2 parts of charcoal. The dry mixture thus obtained will be found to be an effective seed disinfectant.

It will be apparent from the foregoing that there are many mercury derivatives of thiophene and thiophene compounds which can be used for my purpose. Instead of alpha-chlormercuri thiophene, I may, for example, use 5-chloromercuri-2-methyl-thiophene, such derivatives as 2:5-dichloromercuri-3-ethyl-thiophene, 2-chloro-mercuri-4:5-dimethyl-thiophene, 2-chlor-mercuri-5-ethyl-thiophene, or acetoxymercuri-benz-thiophene. The mercury compounds of halogenated thiophenes are also effective seed disinfectants.

I have not described the method of making these compounds since this is well known. The alpha-chlormercuri thiophene, for example, can be obtained very easily by the treatment of thiophene with mercuric chloride and sodium acetate. 2-acetoxy-mercuri-5-hydroxymercurithiophene can be obtained by simply refluxing commercial benzene with mercuric acetate, the thiophene present in the benzene being acted upon by the mercuric acetate with very little action on benzene itself. A mixture of thiophene derivatives also can be made by passing acetylene and hydrogen sulfide over heated metallic oxides such as ferric or aluminum oxide. The thiophene derivatives formed can be separated one from the other, or the mixture can be mercurized directly and the product thus obtained used as a seed disinfectant.

As has been indicated in the foregoing examples, these materials may be used in conjunction with other active disinfectant materials.

As a further convenient method of forming the finished dry seed disinfectant, a single step process may be used without first preparing the organic mercury compound in a separate step, which may be illustrated by the following example:

96 parts of colloidal clay, 1 part of charcoal, 2.4 parts of mercuric acetate, and 0.6 parts of thiophene may be mixed thoroughly for perhaps 24 hours in a ball mill. If necessary the mixture may be warmed by heat supplied artificially. After a period of from 10 to 24 hours, depending upon the temperature and the thoroughness of the mixing, it will be found that the thiophene has reacted with the mercuric acetate with the formation of the mercurithiophene compound, and this mixture is then ready for use in the disinfection of seeds and plant products.

It will be apparent from the foregoing that many variations may be made in the proportions of ingredients and in the diluents used, or even the specific mercurized thiophene compounds employed, without departing from the spirit of my invention. Therefore, it is to be understood that I do not intend to limit myself to the specific embodiments herein except as indicated in the appended claims.

I claim:

1. A composition of matter for the control of seed and plant diseases, the active constituent of which comprises a mercurized derivative of a thiophene compound.

2. A composition of matter for the control of seed and plant diseases the active constituent of which comprises a halogenated mercurized derivative of thiophene.

3. A composition of matter for the control of seed and plant diseases the active constituent of which comprises a chlorinated mercurized derivative of thiophene.

4. A composition of matter for the control of seed and plant diseases the active constituent of which comprises a chlorinated mercurized thiophene.

5. A disinfectant composition for seed and plant diseases comprising a mercurized thiophene.

6. A disinfectant composition for the control of seed and plant diseases comprising a diluted mercurized thiophene.

7. A composition of claim 6 in which the diluent is taken from a group consisting of calcium carbonate, calcium sulphide, lime, bentonite, and charcoal.

8. A disinfectant composition for the control of seed and plant diseases comprising a halogenated mercurized thiophene compound.

9. A disinfectant composition for the control of seed and plant diseases comprising a chlorinated mercurized thiophene compound.

MORRIS S. KHARASCH.